June 4, 1935. H. ALFARO 2,003,620
AIRCRAFT HAVING SUSTAINING ROTORS
Original Filed Dec. 9, 1931 3 Sheets-Sheet 1
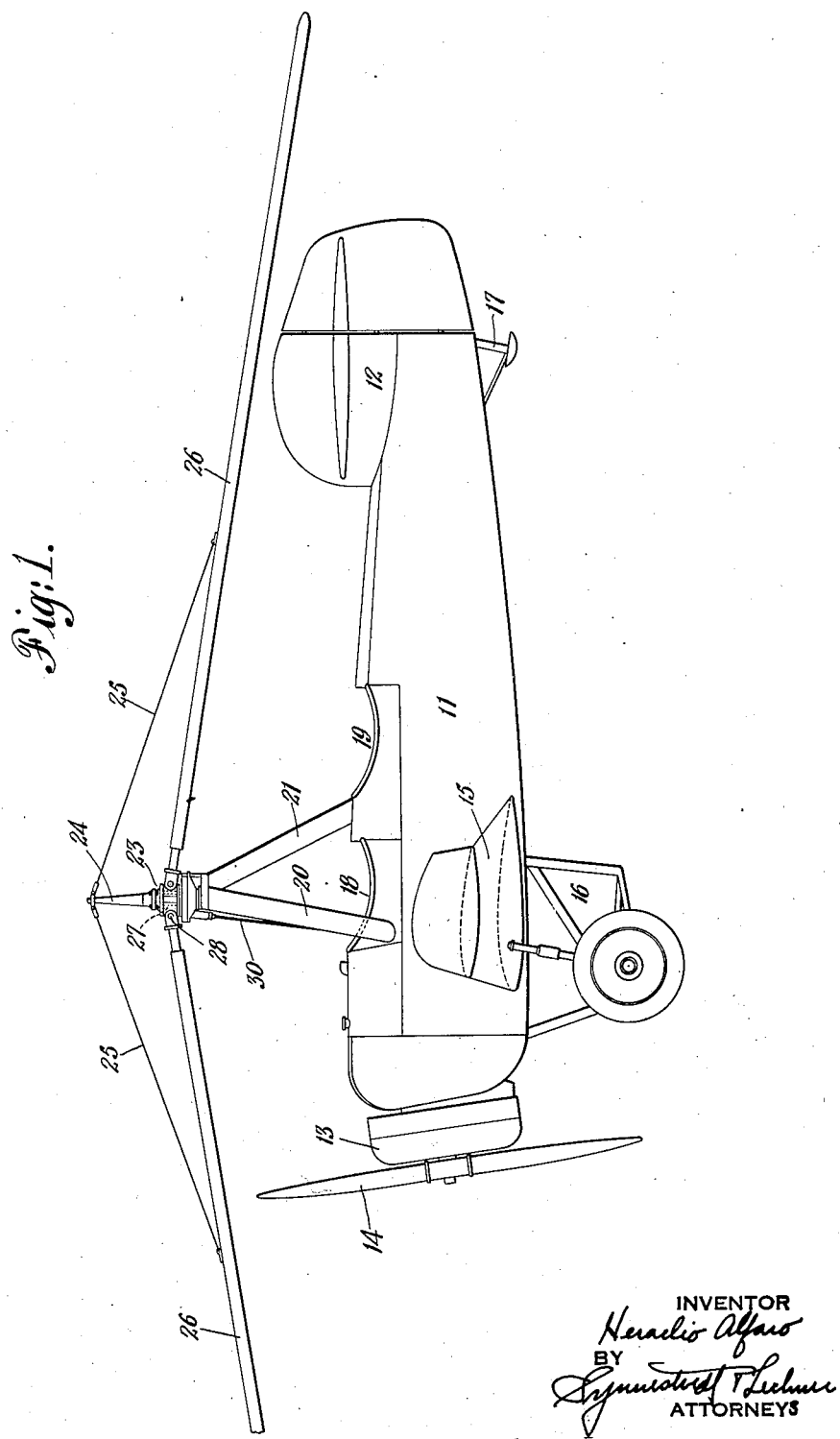

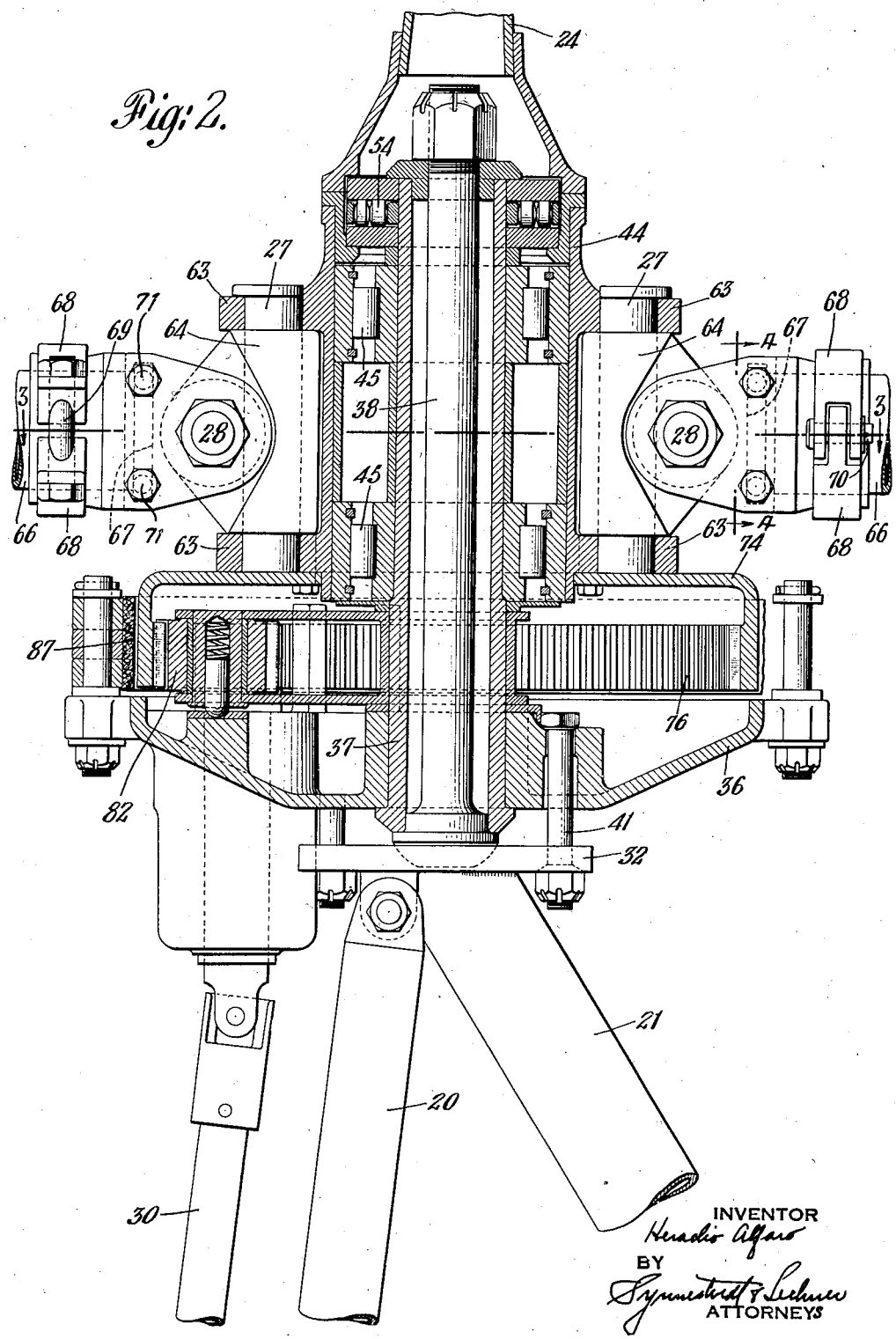

June 4, 1935.  H. ALFARO  2,003,620
AIRCRAFT HAVING SUSTAINING ROTORS
Original Filed Dec. 9, 1931   3 Sheets-Sheet 3

INVENTOR
Heraclio Alfaro
BY
ATTORNEYS

Patented June 4, 1935

2,003,620

UNITED STATES PATENT OFFICE 2,003,620

AIRCRAFT HAVING SUSTAINING ROTORS

Heraclio Alfaro, Cambridge, Mass., assignor to Autogiro Company of America, Philadelphia, Pa., a corporation of Delaware Original application December 9, 1931, Serial No. 579,853. Divided and this application May 24, 1934, Serial No. 727,245

4 Claims. (Cl. 170—164)

This invention relates to aircraft having sustaining rotors and is more particularly concerned with the type of craft in which the sustaining rotor is composed of a plurality of sustaining blades or wings mounted for rotation about a common substantially vertically extended axis and also for individual movements with respect to the rotor axis structure in order to compensate for variations in flight forces.

More specifically the invention has reference to an improved means for adjustably mounting the rotative sustaining wings or blades. Still further it is the object of the invention to provide an effective and yet very simple device by means of which the wing or blade incidence may be adjusted.

Other more or less general objects and advantages contemplated by this invention include simplification of the mounting and rotor driving mechanisms, reduction in the size and weight of such mechanisms so that parasite drag, head resistance and the like are reduced to a minimum, and the general efficiency of the craft as a whole is improved.

How the foregoing, together with other objects and advantages are obtained will be appreciated from the following description, making reference to the accompanying drawings in which—

Figure 1 is a side elevational view of a craft constructed to embody various novel features of this invention including the adjustable blade mounting hereinbefore referred to;

Figure 2 is a vertical sectional view through the rotor hub or head structure, this view also including portions of the mounting structure for the rotor system;

Figure 3 is a horizontal sectional view taken substantially as indicated by the section line 3—3 on Figure 2; and Figure 4 is a sectional view taken as indicated by the section line 4—4 on Figure 2.

It should first be noted that in Figure 1 the craft illustrated includes a fuselage 11 having an empennage 12 and an engine and propeller 13—14. Supplemental fixed lifting surfaces 15 may be extended laterally at the sides of the craft and suitable landing gear 16 as well as a tail skid 17 serve to support the craft on the ground.

The fuselage 11 is provided with a pair of cockpits 18—19 over the forward one of which (18) the rotor system is mounted. For the purpose of mounting the rotor I prefer to employ a plurality of leg elements 20—21 which, as indicated in Figure 1, serve to support the rotor hub, generally indicated by the reference numeral 23. An upward extension 24 of the hub 23 serves as a point of attachment of the blade supporting cables 25, these cables being provided in order to prevent the blades from drooping unduly when the rotor is not operating at flight speeds or when the rotor is at rest.

As shown in Figure 1, the rotor system itself is composed of a plurality of wings or blades 26 which are mounted for rotation, under the action of relative air flow, about the axis of the mechanism 23 and which are also pivotally attached to such mechanism as by means of vertically and horizontally extended pivot pins 27 and 28.

As seen in Figure 2, the rotor head may be supported at the top of the posts 20 and 21 by means of a plate 32 and bolts 41. The rotor head includes a normally fixed hub base 36 which is centrally apertured to receive spindle 37 projecting upwardly and surrounded by radial bearings 45—45 as well as a thrust bearing 54, all of these bearings being in turn surrounded by the rotatable hub member 44 on which the blades are mounted. The thrust of sustension of the craft is transmitted from the blade mounting hub member 44 through the thrust bearing 54 to the central tie member or bolt 38 from which the thrust is carried downwardly to the fixed hub base 36 and thence to the supporting posts 20 and 21.

The mechanism illustrated in the drawings also includes a rotor braking and rotor driving means and while these parts need not be considered in detail herein, it is noted that a drive shaft 30 (see Figures 1 and 2) extends upwardly from the body of the craft preferably from the engine 13, to connect with a pinion 82 which is adapted to mesh with the internal ring gear 76 carried by the downturned drum 74 which is, in turn, carried by the rotatable hub member 44. It is further mentioned that the drive system preferably includes a means permitting overrunning of the rotor with respect to the drive so that the blades may be free for autorotational actuation in flight.

The braking mechanism may take the form of a brake band surrounding the outside of the cylindrical portion of drum 74, a fragment of this band being illustrated at 87 in Figure 2.

For the purpose of attaching the individual blades to the rotor hub 44, this hub member is provided with pairs of vertically spaced and vertically apertured lugs 63 into which the vertically extended individual blade pivot pins 27 are inserted, said lugs being easily and conveniently formed by squaring off the flange members which are shown at 63a in Figure 3.

Each of the blades is secured to its vertical pivot pin 27 in substantially the following manner:

An extension block or joint member 64 (see Figs. 2 and 3) is apertured to receive the pin 27 and is further provided with an additional aperture extended substantially horizontally to receive the pin 28. The horizontally apertured portion of the block 64 is further embraced by bracket members 65—65 which constitute a forked blade root fitting. In Figures 2 and 3 the root end of the blade spar is indicated at 66' as being extended into a cylindrical fitting 66 which, in turn, is received between the complementary bracket members 65—65 to be embraced thereby. At its inner end, the blade spar fitting 66 is further provided with a squared block 67 which may conveniently abut against the base of the root fitting 65—65 in the manner clearly illustrated in Figure 2. After assembly of these parts a split securing or fastening ring 68—68 is applied to the two parts of the fitting 65—65 and rigidly tightened thereon as by means of the bolt 69. The two halves of the ring 68—68 are, of course, pivoted to each other at a point diametrically opposite to the bolt 69 as by means of a pivot pin 70.

In order to provide for adjustment of the incidence of the individual blades, I prefer to employ adjusting bolts 71 arranged at four corners of the squared block 67 and taking into the fork parts of the brackets 65—65. The disposition of these adjusting parts in the manner just described provides for an extremely simple blade incidence adjustment, all the parts of which are compactly arranged as well as disposed in such manner as to utilize space between the bracket members 65—65. The frontal area and weight of these various parts is thus kept very small.

It might also be mentioned that the blade mounting structure as shown in Figure 3, includes projecting bracket members 72 between which and the hub member 44 itself resilient or rubber blocks 73 are inserted for the purpose of yieldingly resisting blade movement about the upright blade articulations 27.

From the foregoing it will be seen that all of the rotor hub and blade mounting parts cooperate neatly to provide a compact rotor head assembly and further that all of these parts, including the incidence adjustment mechanism, are of such form or character that they may readily be fabricated. The use of a split fitting for the blade root is also of advantage in simplifying as well as reducing the weight and size of the rotor head in general, especially in view of the incorporation therein of the incidence adjusting mechanism for the blades.

This application is a division of my copending application Serial No. 579,853 filed December 9th, 1931.

What I claim is:—

1. In an air driven rotor system, an axis mechanism, a rotor blade mounted on the axis mechanism, and means for adjusting the incidence of said blade, said means including a squared device fixed at the blade root, bracket means at opposite sides of the squared device and adjusting elements operatively associated with the said device and the bracket means to alter their relative angular positions.

2. In an air driven rotor system, an axis mechanism, a rotor blade mounted on the axis mechanism, and means for adjusting the incidence of said blade, said means including a squared device fixed at the blade root, bracket means at opposite sides of the squared device and adjusting bolts taking into the bracket means and arranged to react against corner portions of said device.

3. In an air driven rotor system, an axis mechanism, a rotor blade mounted on the axis mechanism, and means for mounting the said blade including a pivot pin, a forked device cooperating with the pin, an abutment fixed at the root of the blade and positioned between the forks of said device adjacent the base thereof, and means reacting between said forks and said abutment for adjusting the incidence of the blade.

4. In an air driven rotor system, an axis mechanism, a rotor blade mounted on the axis mechanism, and means for mounting the said blade including a pivot pin, a multi-part forked fitting cooperating with the pivot pin and embracing the blade root, means for securing said fitting to the blade root, and blade incidence adjusting mechanism disposed at least in part between the forks of said fitting and arranged to react between the fitting and the blade root.

HERACLIO ALFARO.